(12) United States Patent
Lee et al.

(10) Patent No.: US 11,375,262 B2
(45) Date of Patent: *Jun. 28, 2022

(54) MAIN IMAGE PROCESSING APPARATUS, SUB IMAGE PROCESSING APPARATUS AND CONTROL METHOD THEREOF

(71) Applicant: SAMSUNG ELECTRONICS CO., LTD., Suwon-si (KR)

(72) Inventors: Chang-soo Lee, Seoul (KR); Yong-hwan Kwon, Seongnam-si (KR); Joon-hwan Kim, Yongin-si (KR); Heui-jin Kwon, Seongnam-si (KR); Jeong-yeon Lee, Seongnam-si (KR); Victor Szilagyi, London (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/175,127

(22) Filed: Feb. 12, 2021

(65) Prior Publication Data

US 2021/0168427 A1    Jun. 3, 2021

Related U.S. Application Data

(63) Continuation of application No. 14/636,738, filed on Mar. 3, 2015, now Pat. No. 10,965,980, which is a (Continued)

(30) Foreign Application Priority Data

Dec. 11, 2008   (KR) .................. 10-2008-0125783

(51) Int. Cl.
   *H04N 21/422*   (2011.01)
   *H04N 21/47*    (2011.01)
   (Continued)

(52) U.S. Cl.
   CPC ....... *H04N 21/4222* (2013.01); *G06F 3/0482* (2013.01); *G06F 3/0486* (2013.01); (Continued)

(58) Field of Classification Search
   None
   See application file for complete search history.

(56) References Cited

U.S. PATENT DOCUMENTS 5,956,025 A    9/1999  Goulden et al.
6,396,523 B1   5/2002  Segal et al.
(Continued)

FOREIGN PATENT DOCUMENTS

EP    1505825 A1    2/2005
EP    1521453 A1    4/2005
(Continued)

OTHER PUBLICATIONS

Communication (Summons to attend oral proceedings) from the European Patent Office issued Apr. 8, 2013 in counterpart European Application No. 09172711.5.
(Continued)

*Primary Examiner* — Christopher R Lamb
(74) *Attorney, Agent, or Firm* — Sughrue Mion, PLLC

(57) ABSTRACT

Disclosed are a main image processing apparatus, a sub image processing apparatus and a control method thereof. The control method of the sub image processing apparatus includes receiving a user's touch input through the sub image processing apparatus; determining which contents correspond to a touched area where the touch input occurs; sensing change in location of the touch input; and transmitting a control command for the contents to the main image processing apparatus in response to the sensed change in the location of the touch input. With this, it is more convenient for a user to control the main image processing apparatus (Continued)

through the sub image processing apparatus supporting the touch input.

22 Claims, 15 Drawing Sheets

Related U.S. Application Data continuation of application No. 12/616,541, filed on Nov. 11, 2009, now abandoned.

(51) Int. Cl.
| | |
|---|---|
| *H04N 21/41* | (2011.01) |
| *G06F 3/0482* | (2013.01) |
| *G06F 3/04842* | (2022.01) |
| *G06F 3/0486* | (2013.01) |
| *G06F 3/04883* | (2022.01) |

(52) U.S. Cl.
CPC ...... *G06F 3/04842* (2013.01); *G06F 3/04883* (2013.01); *H04N 21/41265* (2020.08); *H04N 21/42204* (2013.01); *H04N 21/42209* (2013.01); *H04N 21/42224* (2013.01); *H04N 21/47* (2013.01)

(56) References Cited

U.S. PATENT DOCUMENTS

| | | | |
|---|---|---|---|
| 6,496,927 | B1 | 12/2002 | McGrane et al. |
| 10,965,980 | B2 * | 3/2021 | Lee .................. H04N 21/4126 |
| 2002/0002707 | A1 | 1/2002 | Ekel et al. |
| 2002/0044225 | A1 | 4/2002 | Rakib |
| 2003/0025738 | A1 * | 2/2003 | Polgar .................. G08C 17/02 |
| | | | 715/835 |
| 2004/0107447 | A1 | 6/2004 | Katagishi et al. |
| 2004/0158854 | A1 | 8/2004 | Nagasawa et al. |
| 2004/0257337 | A1 | 12/2004 | Shibamiya et al. |
| 2006/0001771 | A1 | 1/2006 | Hayakawa et al. |
| 2006/0101338 | A1 | 5/2006 | Kates |
| 2006/0107289 | A1 | 5/2006 | DeYonker et al. |
| 2006/0265654 | A1 * | 11/2006 | Nakamura ............ G06F 1/1698 |
| | | | 715/704 |
| 2007/0036128 | A1 | 2/2007 | Mori |
| 2007/0058047 | A1 | 3/2007 | Henty |
| 2007/0146347 | A1 | 6/2007 | Rosenberg |
| 2008/0196068 | A1 | 8/2008 | Tseng |
| 2009/0122206 | A1 | 5/2009 | Jung |
| 2009/0303097 | A1 | 12/2009 | Reams et al. |
| 2010/0053469 | A1 | 3/2010 | Choi |
| 2010/0131979 | A1 | 5/2010 | Sievert et al. |

FOREIGN PATENT DOCUMENTS

| | | | |
|---|---|---|---|
| JP | 8-79847 | A | 3/1996 |
| KR | 10-2007-0039434 | A | 4/2007 |
| KR | 10-0857508 | B1 | 9/2008 |
| WO | 03/044625 | A2 | 5/2003 |
| WO | 2004/059977 | A1 | 7/2004 |
| WO | 2008/130183 | A1 | 10/2008 |

OTHER PUBLICATIONS

Communication dated Apr. 10, 2014, issued by the European Patent Office in counterpart European Application No. 09 172 711.5.
Communication dated Aug. 29, 2014 issued by European Patent Office in counterpart European Application Patent No. 14171675.3.
Communication dated Dec. 19, 2018 issued by the European Intellectual Property Office in counterpart European Application No. 14171675.3.
Communication dated Nov. 12, 2015, issued by the Korean Intellectual Property Office in corresponding Korean Application No. 10-2008-0125783.
Communication dated Apr. 9, 2018, issued by the European Patent Office in counterpart European Patent Application No. 14171675.3.
Communication dated Dec. 1, 2011 by the European Patent Office in the corresponding European Patent Application No. 09172711.5.
Communication dated Oct. 18, 2019 by the European Patent Office in the corresponding European Patent Application No. 19179359.5.
DLNA: "Use Case Scenarios, White Paper", Jun. 2004, pp. 1-15.
Ken Hinckley et al., "Stitching: Pen Gestures that Span multiple Displays", In the Proc. of AVI' 04, pp. 23-31, (2004). ISBN:1-58113-867-9.
Communication dated May 3, 2021, from the European Patent Office in European Application No. 19179359.5.

* cited by examiner

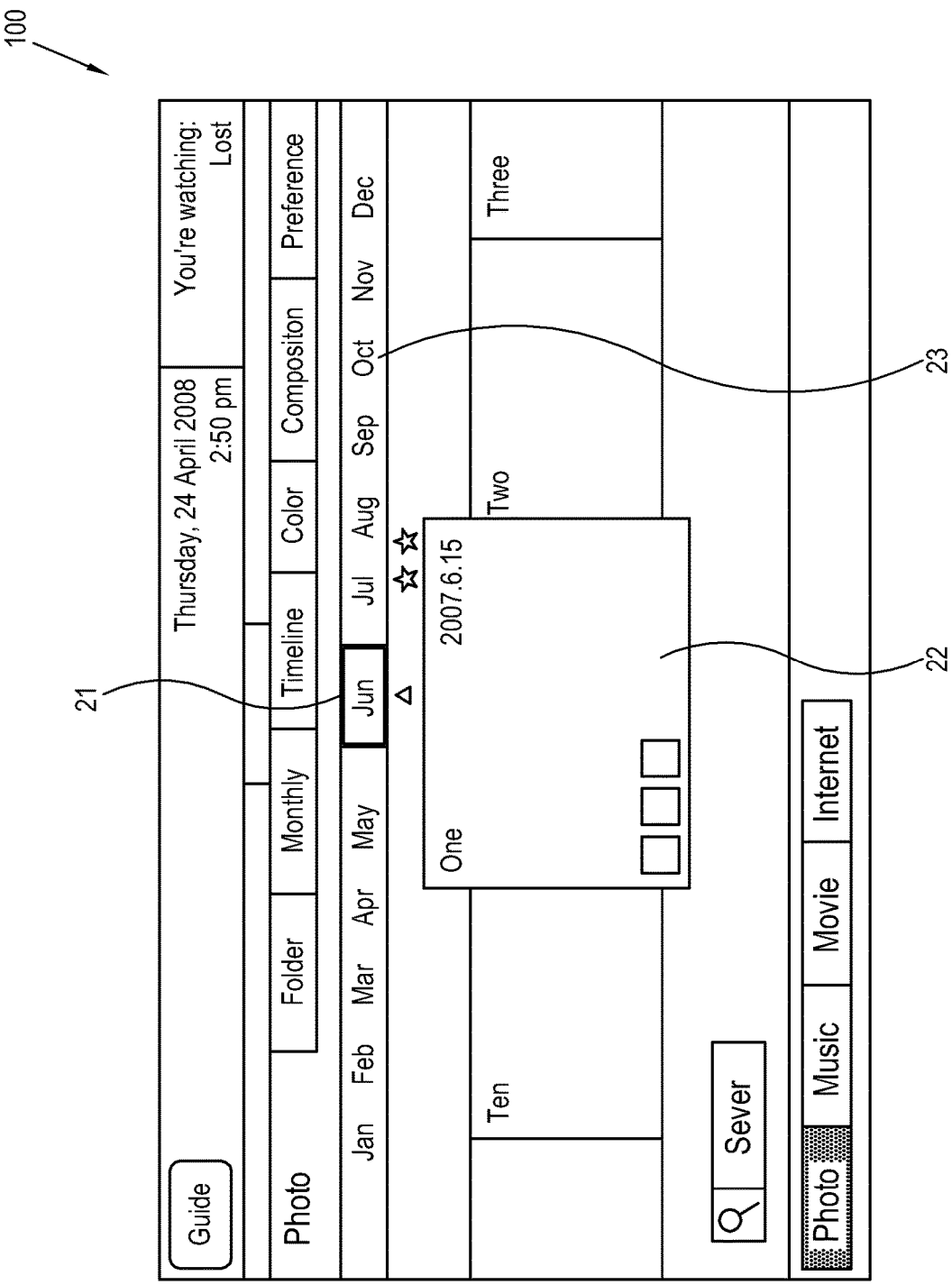

MAIN IMAGE PROCESSING APPARATUS, SUB IMAGE PROCESSING APPARATUS AND CONTROL METHOD THEREOF

CROSS-REFERENCE TO RELATED APPLICATION

This application is a continuation of U.S. application Ser. No. 14/636,738 filed on Mar. 3, 2015, which is a continuation of U.S. application Ser. No. 12/616,541 filed on Nov. 11, 2009, now abandoned, which claims priority from Korean Patent Application No. 10-2008-0125783, filed on Dec. 11, 2008 in the Korean Intellectual Property Office, the disclosures of which are incorporated herein by reference.

BACKGROUND OF INVENTION

Field of Invention

Apparatuses and methods consistent with the present invention relate to a main image processing apparatus, a sub image processing apparatus and a control method thereof, and more particularly, to a main image processing apparatus, a sub image processing apparatus and a control method thereof, in which the sub image processing apparatus is used in transmitting a control command to the main image processing apparatus.

Description of the Related Art

An image processing apparatus receives a video signal from a broadcasting station or a video signal from an external device such as a digital versatile disc (DVD) player or the like, and processes it to be displayed as an image. The image processing apparatus processes not only the broadcasting signal from the broadcasting station but also various contents such as a game application, a still image (photograph), and a moving picture of digital data.

Recently, a demand for a dual image processing system has been on the rise, in which the dual image processing system includes two or more image processing apparatuses and displays contents in various methods according to a user's request.

However, a general dual image processing system receives various control commands from a user through a user input unit provided in the image processing apparatus or an external input device provided separately.

Thus, there is a growing need for a dual image processing system in which one image processing apparatus can be used to transmit a control command to another image processing apparatus.

SUMMARY OF THE INVENTION

The foregoing and/or other aspects of the present invention can be achieved by providing a control method of a sub image processing apparatus connectable with a main image processing apparatus, the control method including: receiving a user's touch input through the sub image processing apparatus; determining which contents correspond to a touched area where the touch input occurs; sensing change in location of the touch input; and transmitting a control command for the contents to the main image processing apparatus in response to the sensed change in the location of the touch input.

The control method of the sub image processing apparatus may further include displaying the contents changed corresponding to the sensed change in the location of the touch input.

The control method of the sub image processing apparatus may further include transmitting information about the contents to the main image processing apparatus if a flicking input in which the touch input moves by a predetermined distance or more in a predetermined direction is sensed in the sensing the change in the location of the touch input.

The transmitting the control command to the main image processing apparatus includes transmitting the control command that makes the contents displayed in the main image processing apparatus be rotated at a predetermined angle and in a predetermined direction if a circle input in which the touch input rotates at the angle and in the direction is sensed in the sensing the change in the location of the touch input.

The transmitting the control command to the main image processing apparatus may include transmitting a channel-switching command for the contents.

The control method of the sub image processing apparatus may further include displaying a control panel for the contents. Here, the control method of the sub image processing apparatus may further include closing the displayed control panel if receiving information about a power-off state of the main image processing apparatus.

The control method of the sub image processing apparatus may further include: receiving information about a power-off state of the main image processing apparatus; and transmitting a power-on command to the main image processing apparatus.

The control method of the sub image processing apparatus may further include animating at least one of the menu item selected corresponding to the touch input and the contents corresponding to the menu item.

Another aspect of the present invention is to provide a control method of a main image processing apparatus connectable with a sub image processing apparatus, the control method including: receiving a control command for contents from the sub image processing apparatus; and displaying the contents changed on the basis of the received control command.

The displaying the contents changed depending on the control command may include switching a channel to correspond to the contents.

The control method of the main image processing apparatus according to claim 10, further including turning on the main image processing apparatus if the image processing apparatus is being turned off.

The control command may include information about rotation at a predetermined angle and in a predetermined direction with regard to the contents, and the displaying the contents changed depending on the control command includes displaying the contents rotated at the angle and in the direction.

Still another aspect of the present invention is to provide a sub image processing apparatus connectable with a main image processing apparatus, the sub image processing apparatus including: a communication unit which communicates with the main image processing apparatus; an image processing unit which processes contents; a display unit which displays the processed contents; a user input unit which receives a user's touch input; and a controller which determines which contents correspond to a touched area where the touch input occurs, sensing change in location of the touch input, and controlling the communication unit to transmit a control command for the contents to the main image processing apparatus in response to the sensed change in the location of the touch input.

The display unit may display the contents changed corresponding to the sensed change in the location of the touch input.

The controller may control the communication unit to transmit information about the contents to the main image processing apparatus if a flicking input in which the touch input moves by a predetermined distance or more in a predetermined direction is sensed.

The controller may control the communication unit to transmit the control command that makes the contents displayed in the main image processing apparatus be rotated at a predetermined angle and in a predetermined direction if a circle input in which the touch input rotates at the angle and in the direction is sensed. Further, the controller may control the display unit to close a control panel for the contents if receiving information about a power-off state of the main image processing apparatus.

The controller may control the communication unit to transmit a power-on command to the main image processing apparatus if receiving information about a power-off state of the main image processing apparatus.

Yet another aspect of the present invention is to provide a main image processing apparatus connectable with a sub image processing apparatus, the main image processing apparatus including: a communication unit which communicates with the sub image processing apparatus; an image processing unit which processes contents; a display unit which displays the processed contents; and a controller which receives a control command for the contents from the sub image processing apparatus, and controls the image processing unit to display the contents changed on the basis of the received control command.

The controller may turn on the main image processing apparatus when the main image processing apparatus is being turned off, and control the image processing unit to display the contents.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Below, exemplary embodiments of the present invention will be described in detail with reference to accompanying drawings.

Figure 1A:
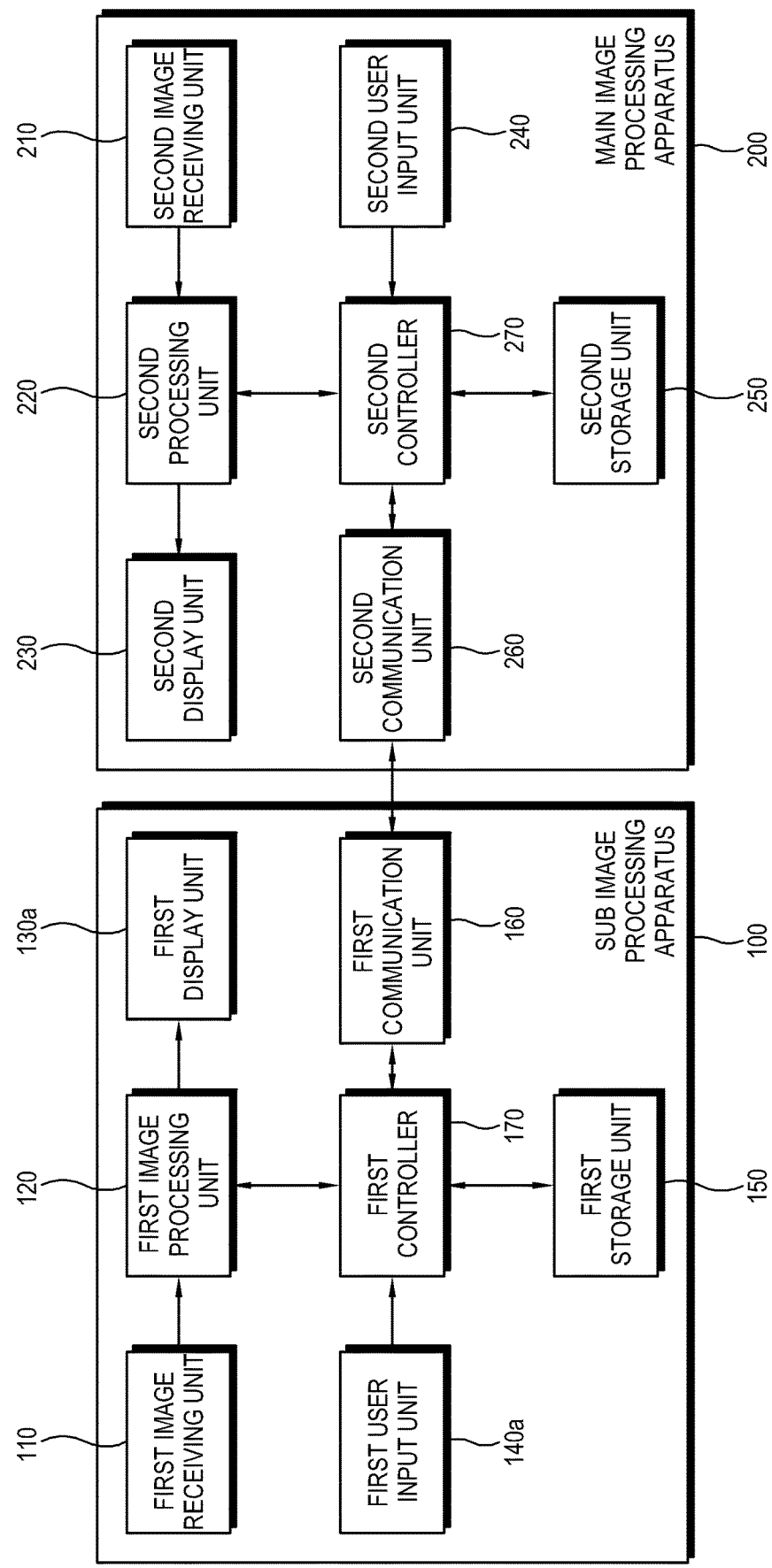
FIGS. 1A and 1B are block diagrams of dual image processing systems according to exemplary embodiments of the present invention.

FIG. 1A is a block diagram of a dual image processing system 10 according to an exemplary embodiment of the present invention. The dual image processing system 10 includes a sub image processing apparatus 100, and a main image processing apparatus 200 that receives a control command from the sub image processing apparatus 100.

In this exemplary embodiment, the sub image processing apparatus 100 is a portable media player capable of processing an image about various contents such as a still image (photograph), a moving picture, music, etc., and the main image processing apparatus 200 may be achieved by a digital television (TV), a set-top box, etc. The sub image processing apparatus 100 transmits a control command to the main image processing apparatus 200 in order to control operation of the main image processing apparatus 200.

As shown in FIG. 1A, the sub image processing apparatus 100 includes a first image receiving unit 110, a first image processing unit 120, a first display unit 130a, a first user input unit 140a, a first storage unit 150, a first communication unit 160, and a first controller 170.

The first image receiving unit 110 receives a video signal from a broadcasting station or from an external device such as a DVD player or the like. The first image receiving unit 110 includes an antenna, a tuner, etc. to receive a broadcasting signal. Meanwhile, the sub image processing apparatus 100 according to this embodiment may receive a video signal from the outside via a network.

The first image processing unit 120 processes the video signal received by the first image receiving unit 110 into a signal having a format displayable in the first display unit 130a.

The first display unit 130a displays contents processed by the first image processing unit 120. The first display unit 130a may change and display the contents corresponding to change in location of touch input on the first user input unit 140.

The first display unit 130a includes a display panel (not shown) where the contents are displayed, and a panel driver (not shown) to drive the video signal output from the first image processing unit 120 to be displayed on the display panel. In this exemplary embodiment, the display panel (not shown) may include a liquid crystal display (LCD) panel or a plasma display panel (PDP) by way of example.

The first user input unit 140a may be a control panel, which includes at least one button and is provided in the sub image processing apparatus 100, as a user interface (UI) to receive a user's instruction. The control panel may include specific keys such as a menu key, an arrow key, etc. The first controller 170 determines that a user gives instructions when a button of the control panel is pressed.

Figure 1B:
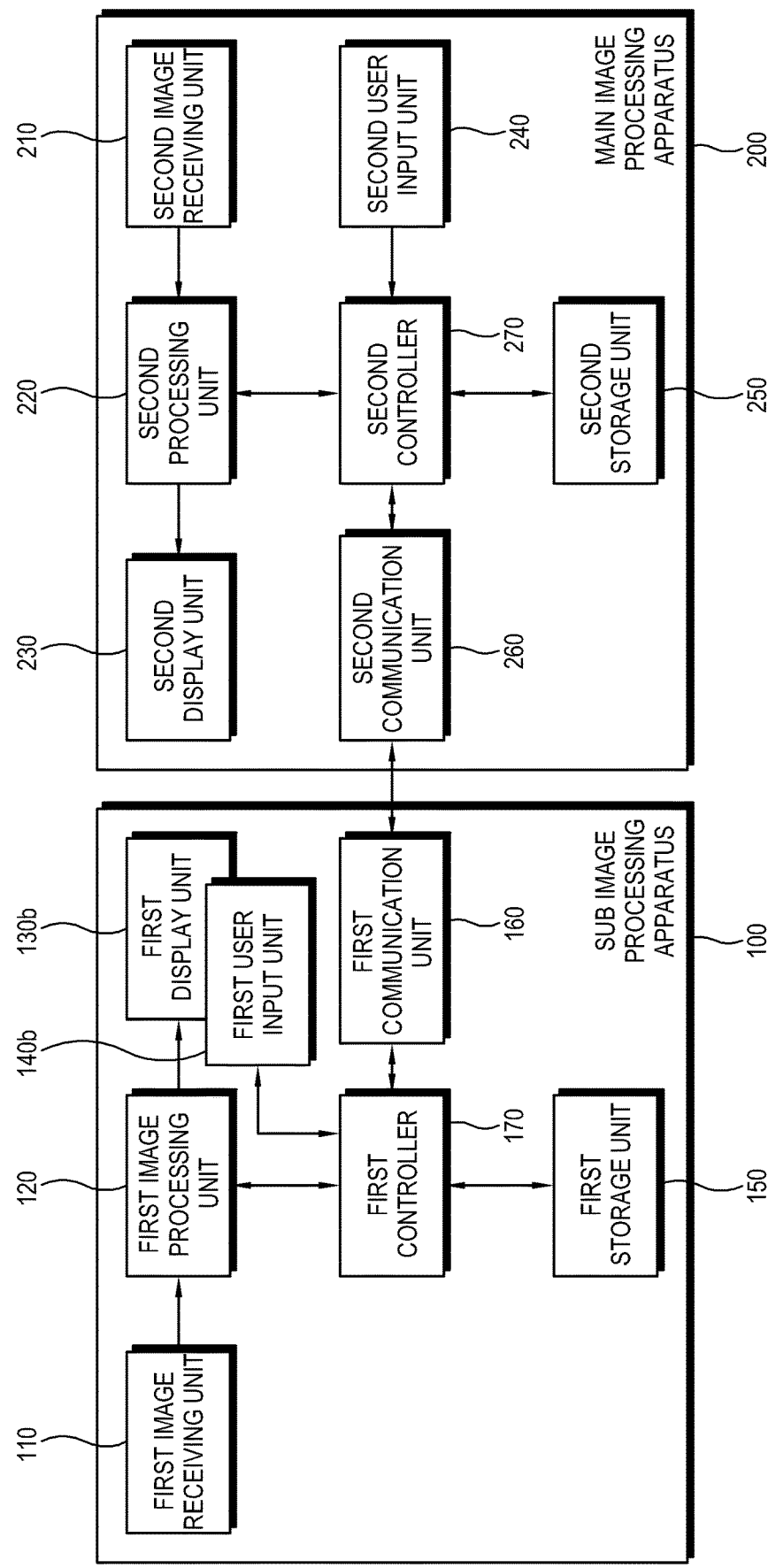

In another exemplary embodiment, as a first user input unit 140b, the first user input unit 140a may further include a touch panel (hereinafter, it will be also referred to as a "touch pad" or "touch screen") which is in the first display unit 130b and receives a user's touch input (FIG. 1B). The touch panel may include a graphic user interface (GUI) presented by executing a predetermined application and displayed on the first display unit 130b as a touch area enabling a user's touch input.

Here, the touch input is an input based on a touch of a user, which not only includes a touch, a tap or the like, but also includes at least one of tap and hold, drag and drop, flicking and circle as a directional gesture input. Below, the touch input will be explained in more detail with exemplary embodiments to be described.

Further, the first user input unit 140a, 140b displays a plurality of menu items 21 (refer to FIG. 5A), and a menu navigation displayed in an area of the first display unit 130a, 130b. The first display unit 130a, 130b includes a view zone 22 (refer to FIG. 5A) to display thumbnail contents corresponding to a menu item 21 selected in the menu navigation, in which the view zone 22 may receive the touch input of a user.

Meanwhile, the first user input unit 140a, 140b receives a user's instruction for controlling the main image processing apparatus 200. Specifically, the first user input unit 140a, 140b includes a TV control panel 24 (refer to FIG. 5B) presented to control the contents displayed on the main image processing apparatus 200 and displayed on the first display unit 140a, 140b. If the touch input is received through the TV control panel 24, the first controller 170 controls the first communication unit 160 to transmit a control command corresponding to the touch input to the main image processing apparatus 200.

The first storage unit 150 stores the contents received from the outside. Here, an image stored in the first storage unit 150 may include not only a broadcasting signal transmitted from the broadcasting station and received by the first image receiving unit 110, but also contents such as a game application, a still image (photograph), and a moving picture of digital data received from various external sources such as a DVD player, an MP3 player, a digital camera, etc.

The first storage unit 150 may include an internal storage medium such as a flash memory, an erasable programmable read only memory (EPROM) and a hard disk drive (HDD), or a portable storage medium such as a universal serial bus (USB) memory and a memory card (a memory stick, a compact flash card, and a multi-media card (MMC)).

The first communication unit 160 performs wire/wireless communication with the outside according to a predetermined communication protocol. Specifically, the first communication unit 160 transmits a control command corresponding to the touch input of a user to the main image processing apparatus 200, and transmits the contents stored in the first storage unit 150 to the main image processing apparatus 200. Further, the first communication unit 160 may receive the contents from the main image processing apparatus 200.

Here, the control command is a signal for giving various commands of a user such as power on/off of the main image processing apparatus 200, switch of a channel, synchronization between the sub image processing apparatus 100 and the main image processing apparatus 200, adjustment of screen and volume, and recording reservation, etc.

Further, the first communication unit 160 may communicate with not only the main image processing apparatus 200 but also various connectable external apparatuses to transmit and receive the contents.

The first communication unit 160 may include a wired/wireless communication module connectable with the outside locally or through a network based on a predetermined protocol, a USB port connectable with a portable storage medium such as a USB memory, etc.

The first controller 170 performs general control of the sub image processing apparatus 100. In more detail, if a user touches the first user input unit 140a, 140b for input, the first controller 170 determines contents corresponding to a touched area and controls the first communication unit 160 to transmit a control command about the determined contents to the main image processing apparatus 200.

Here, the control command may be given as a control command that makes the same contents as displayed on the first display unit 130a, 130b be displayed on a second display unit 230 of the main image processing apparatus 200.

In more detail, the first controller 170 determines the contents corresponding to the touched area where the touch input is performed, and, if sensing a location change of the touch input by a touch input having directionality (e.g., flicking), transmits the control command about the contents to the main image processing apparatus 200 in response to the sensed location change. Here, the touched area may include the view zone 22 where the contents are displayed.

Further, the transmitted control command may include a power-on command for the main image processing apparatus 200 in the state that the main image processing apparatus 200 has been turned off. For example, the first controller 170 transmits the power-on command to the main image processing apparatus 200 when receiving information about the power-off state of the main image processing apparatus 200 in the state that the touch input is given for transmitting the contents displayed on the first display unit 130a, 130b to the main image processing apparatus 200. Then, the first controller 170 controls the first communication unit 160 to transmit the contents displayed on the first display unit 130a, 130b to the main image processing apparatus 200, and transmit the control command for displaying the transmitted contents to be displayed on the second display unit 230 of the main image processing apparatus 200.

Further, the first controller 170 may control the first communication unit 160 to transmit a channel-shifting command for the determined contents.

The first controller 170 may be achieved by a relevant software program, and a processor such as a microcomputer, a central processing unit (CPU), or the like to load and execute this program.

Meanwhile, as shown in FIGS. 1A and 1B, the main image processing apparatus 200 according to an exemplary embodiment of the present invention may include a second image receiving unit 210, a second image processing unit 220, a second display unit 230, a second user input unit 240, a second storage unit 250, a second communication unit 260, and a second controller 270.

The second image receiving unit 210 receives a video signal from a broadcasting station or from an external device such as a DVD player or the like. The second image receiving unit 210 includes an antenna, a tuner, etc. to receive a broadcasting signal.

The second image processing unit 220 processes the video signal received by the second image receiving unit 210 into a signal having a format displayable in the second display unit 230.

The second display unit 230 displays contents processed by the second image processing unit 220.

The second display unit 230 includes a display panel (not shown) where the contents are displayed, and a panel driver (not shown) to drive the video signal output from the second image processing unit 220 to be displayed on the display panel. In this embodiment, the display panel (not shown) may include a liquid crystal display (LCD) panel or a plasma display panel (PDP) by way of example.

The second user input unit 240 may be achieved by a control panel, which includes at least one button and is provided in the main image processing apparatus 200, as a user interface (UI) to receive a user's instruction. The control panel may include specific keys such as a menu key, an arrow key, etc. The second controller 270 determines that a user gives instructions when a button of the control panel is pressed.

Further, the second user input unit 240 may further include a graphic user interface (GUI) presented by executing a predetermined application and displayed on the second display unit 230 as a touch area enabling a user's touch input.

The second storage unit 250 stores the contents received from the outside. Here, an image stored in the second storage unit 250 may include not only a broadcasting signal transmitted from the broadcasting station and received by the second image receiving unit 210, but also an image received from the sub image processing apparatus 100 through the second communication unit 260 and contents such as a game application, a still image (photograph), and a moving picture of digital data received from various external sources such as a DVD player, an MP3 player, a digital camera, etc.

The second storage unit 250 may include an internal storage medium such as a flash memory, an erasable programmable read only memory (EPROM) and a hard disk drive (HDD), or a portable storage medium such as a universal serial bus (USB) memory and a memory card (a memory stick, a compact flash card, and a multi-media card (MMC)).

The second communication unit 260 performs wire/wireless communication with the outside according to a predetermined communication protocol. Specifically, the second communication unit 260 receives a control command from the sub image processing apparatus 100.

Further, the second communication unit may receive contents from the sub image processing apparatus 100. Here, the sub image processing apparatus 100 may decode (or trans-code) the contents to have a predetermined format before transmitting the contents, and transmit it to the main image processing apparatus 200.

Here, the control command is a signal for giving various commands of a user such as power on/off of the main image processing apparatus 200, switch of a channel, synchronization between the sub image processing apparatus 100 and the main image processing apparatus 200, adjustment of screen and volume, and recording reservation, etc.

Further, the second communication unit 260 may communicate with not only the sub image processing apparatus 100 but also various connectable external apparatuses to transmit and receive the contents.

The second communication unit 260 may include a wired/wireless communication module connectable with the outside locally or through a network based on a predetermined protocol, a USB port connectable with a portable storage medium such as a USB memory, etc.

The second controller 270 performs general control of the main image processing apparatus 200. In more detail, if receiving a control command from the sub image processing apparatus 100 through the second communication unit 260, the second controller 270 controls the second image processing unit 220 to control the contents displayed on the second display unit 230 in response to the received control command.

Here, the received control command may be given as a control command that makes the same contents as displayed on the first display unit 130*a*, 130*b* of the sub image processing apparatus 100 be displayed on the second display unit 230.

Further, the second controller 270 may turn on the main image processing apparatus 200 and control the second image processing unit 220 to display the contents corresponding to the relevant control command, when receiving the control command in the state that the main image processing apparatus 200 has been turned off.

The second controller 270 may be achieved by a relevant software program, and a processor such as a microcomputer, a central processing unit (CPU), or the like to load and execute this program.

Below, exemplary embodiments of controlling the main image processing apparatus 200 through the sub image processing apparatus 100 will be described in more detail with reference to accompanying drawings.

Figure 2:
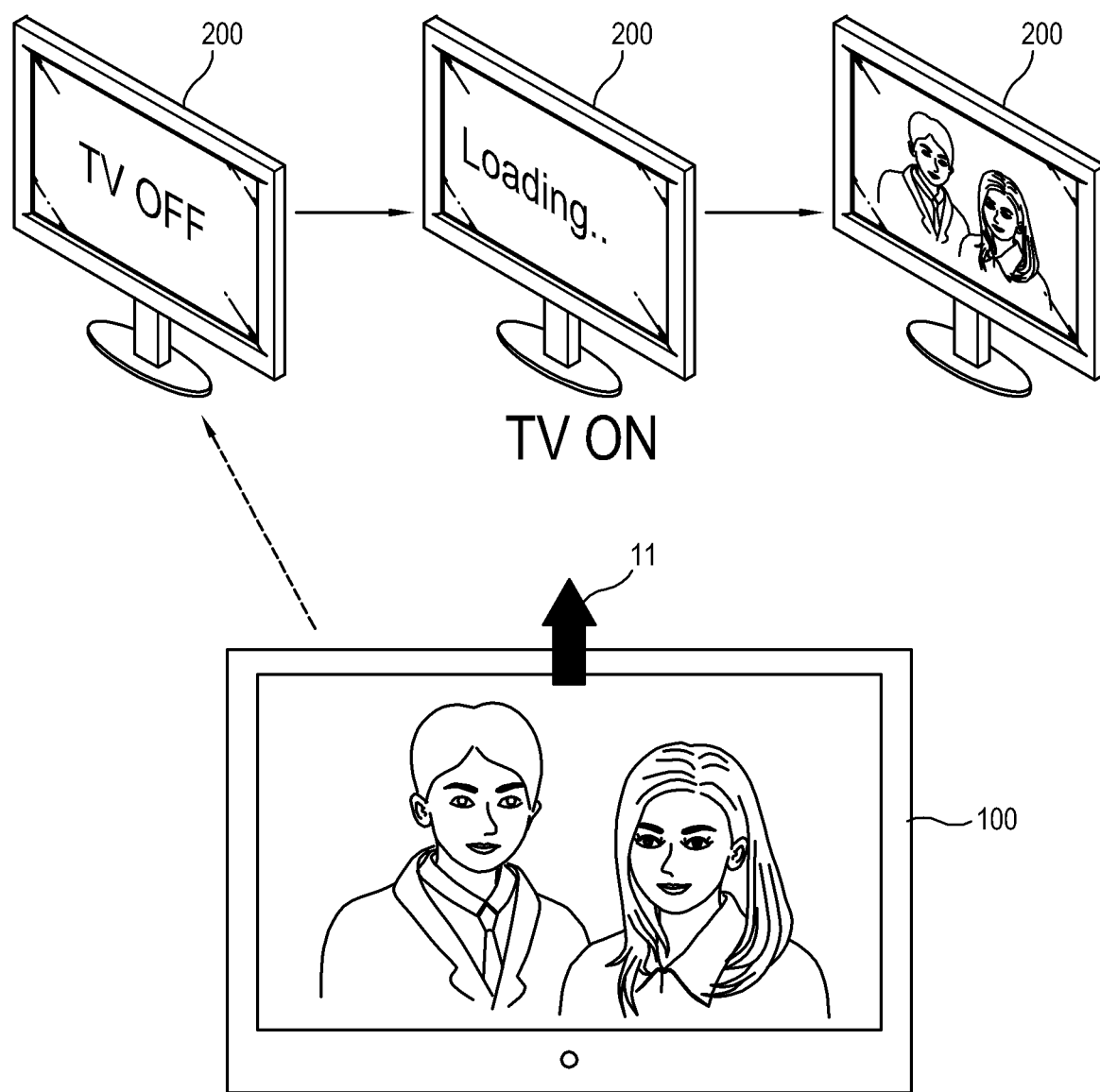
FIGS. 2 and 3 illustrate control of a main image processing apparatus as a user touches a sub image processing apparatus for input.
Figure 3:
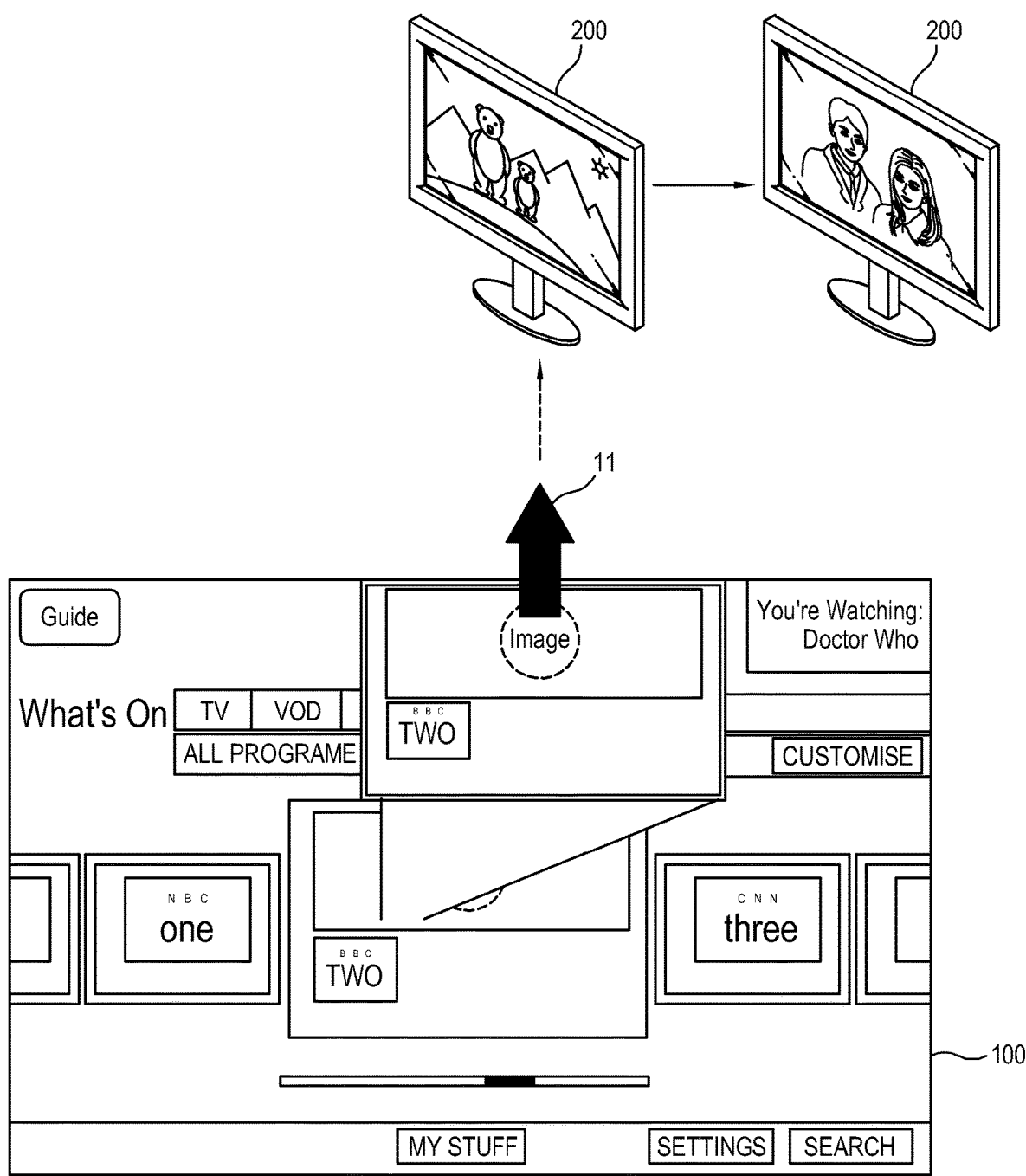

FIGS. 2 and 3 illustrate control of the main image processing apparatus 200 as a user touches the sub image processing apparatus 100 for input.

As shown in FIG. 2, the sub image processing apparatus 100 may receive a flicking input 11 as the touch input while displaying predetermined contents. In this embodiment, the flicking input 11 means a touch input based on tap & hold where a finger or the like (e.g., a stylus) moves in a predetermined direction (e.g., toward the main image processing apparatus 200 or an upward direction of the touch screen) and by a predetermined distance or more in a predetermined direction while being in contact with a touching area corresponding to the predetermined contents.

When receiving the flicking input 11 toward the main image processing apparatus 200 for the contents displayed on the first display unit 130*a*, 130*b*, the first controller 170 transmits the control command to the main image processing apparatus 200 so that the same contents as displayed on the first display unit 130*a*, 130*b* can be displayed on the second display unit 230. To this end, the sub image processing apparatus 100 may transmit information about relevant contents to the main image processing apparatus 200. The main image processing apparatus 200 displays the relevant contents on the second display unit 230 on the basis of the information about the received contents.

If the main image processing apparatus 200 has been turned off as shown in FIG. 2, the first controller 170 receives information about the power-off state of the main image processing apparatus 200 and transmits a power-on command to the main image processing apparatus 200 on the basis of the received information about the power-off state. The second controller 270 turns on the main image processing apparatus 200 on the basis of the received power-on command, and controls the second image processing unit 220 so that the same contents as displayed on the first display unit 130*a*, 130*b* can be displayed on the second display unit 230 on the basis of the control command corresponding to the flicking input 11. In an exemplary embodiment, the main image processing apparatus 200 in a "power-off" state may not be entirely "off" in that the image processing apparatus 200 may be in a low power consumption setting so that it can receive and process a power-on command.

As shown in FIG. 3, if the contents displayed on the first display unit 130*a*, 130*b* of the sub image processing apparatus 100 include channel information, the first controller 170 may control the first communication unit 160 to transmit a channel-switching command to the main image processing apparatus 200. Thus, the main image processing apparatus 200 displays contents corresponding to a channel changed by the received channel-switching command. Here, if the channel-switching command is received while the main image processing apparatus 200 has been turned off, the second controller 270 receives the power-on command from the sub image processing apparatus 100 and turns on the main image processing apparatus 200 in response to the power-on command, thereby controlling the second image processing unit 220 to display contents corresponding to the channel-switching command.

FIGS. 4A to 6B shows control screens displayed on the first display unit 130a, 130b of the sub image processing apparatus 100 according to an exemplary embodiment of the present invention.

As shown in FIG. 4A, on an area of the first display unit 130a, 130b are displayed the menu navigation including the plurality of menu items 21, and the view zone 22 where the thumbnail contents are displayed corresponding to the menu item 21 selected in the menu navigation. Here, the area where the menu item 21 selected in the menu navigation is displayed is a target zone.

Figure 4B:
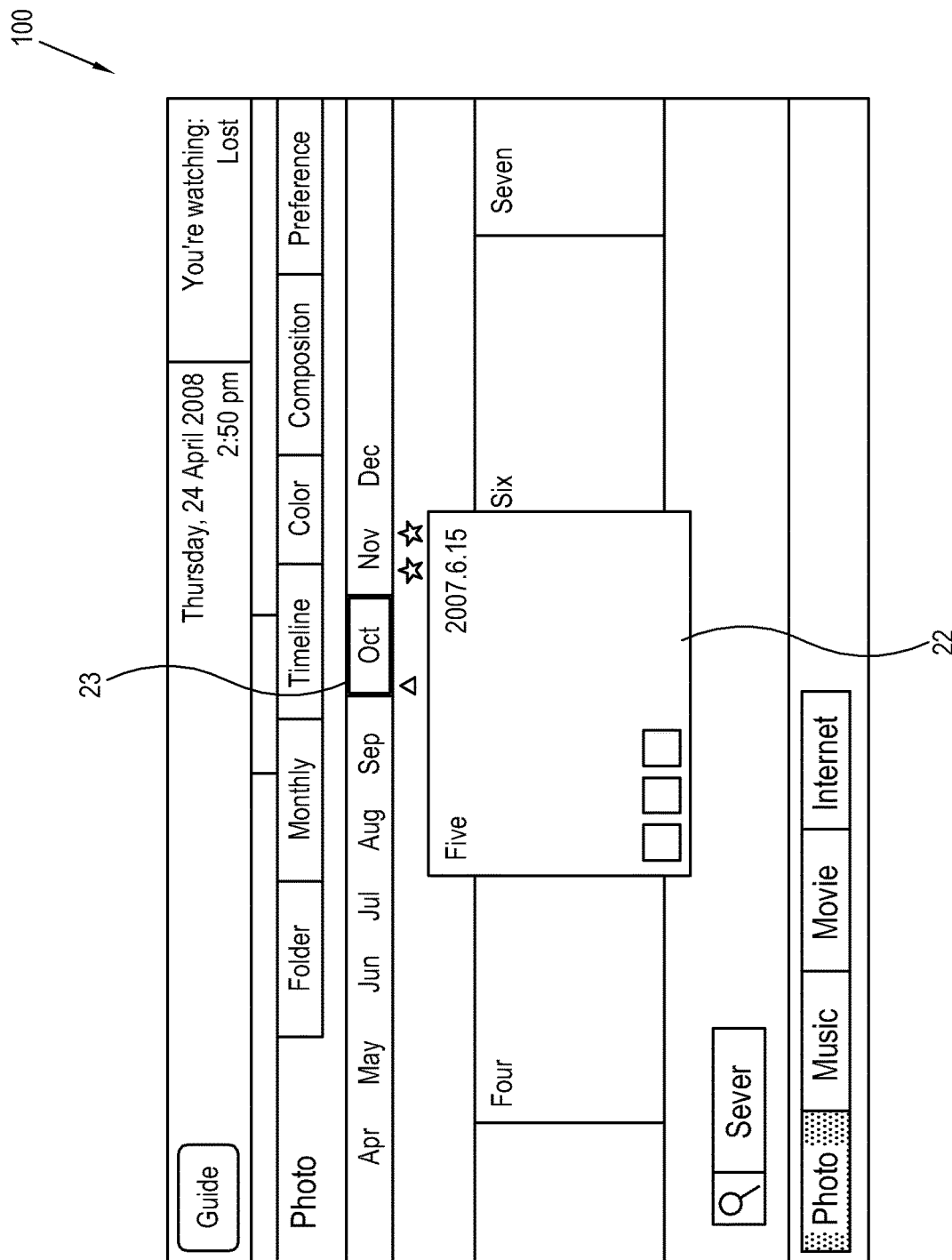
FIGS. 4A to 6B shows control screens displayed on the sub image processing apparatus according to an exemplary embodiment of the present invention.

In FIG. 4A if a user selects not the currently displayed contents but another menu item 23 through the touch input, the first display unit 130a, 130b displays the thumbnail contents corresponding to the selected menu item 23 on the view zone 22 as shown in FIG. 4B.

Figure 5A:
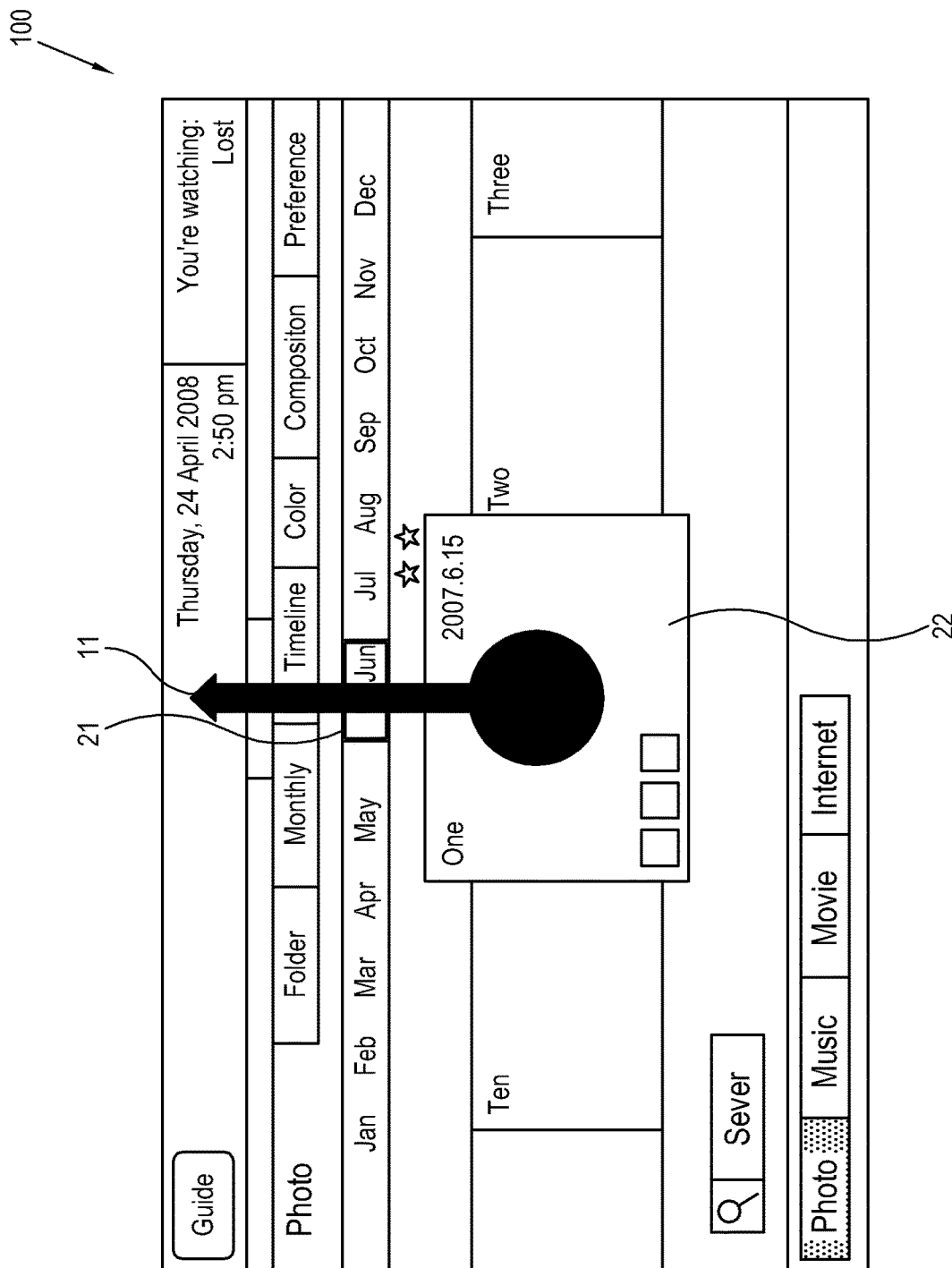

As shown in FIG. 5A, if there is the flicking input 11 from a user while the view zone 22 displays predetermined contents, the sub image processing apparatus 100 senses change in location due to the flicking input 11 and transmits a control command about the contents to the main image processing apparatus 200. Thus, the main image processing apparatus 200 displays the contents corresponding to the flicking input 11.

Here, the first display unit 130a, 130b may animate at least one of the menu item selected corresponding to the received touch input and the contents displayed on the view zone 22 corresponding to the menu item. For example, the animation in this exemplary embodiment may include the menu item or the contents being displayed while moving in sequence.

Figure 5B:
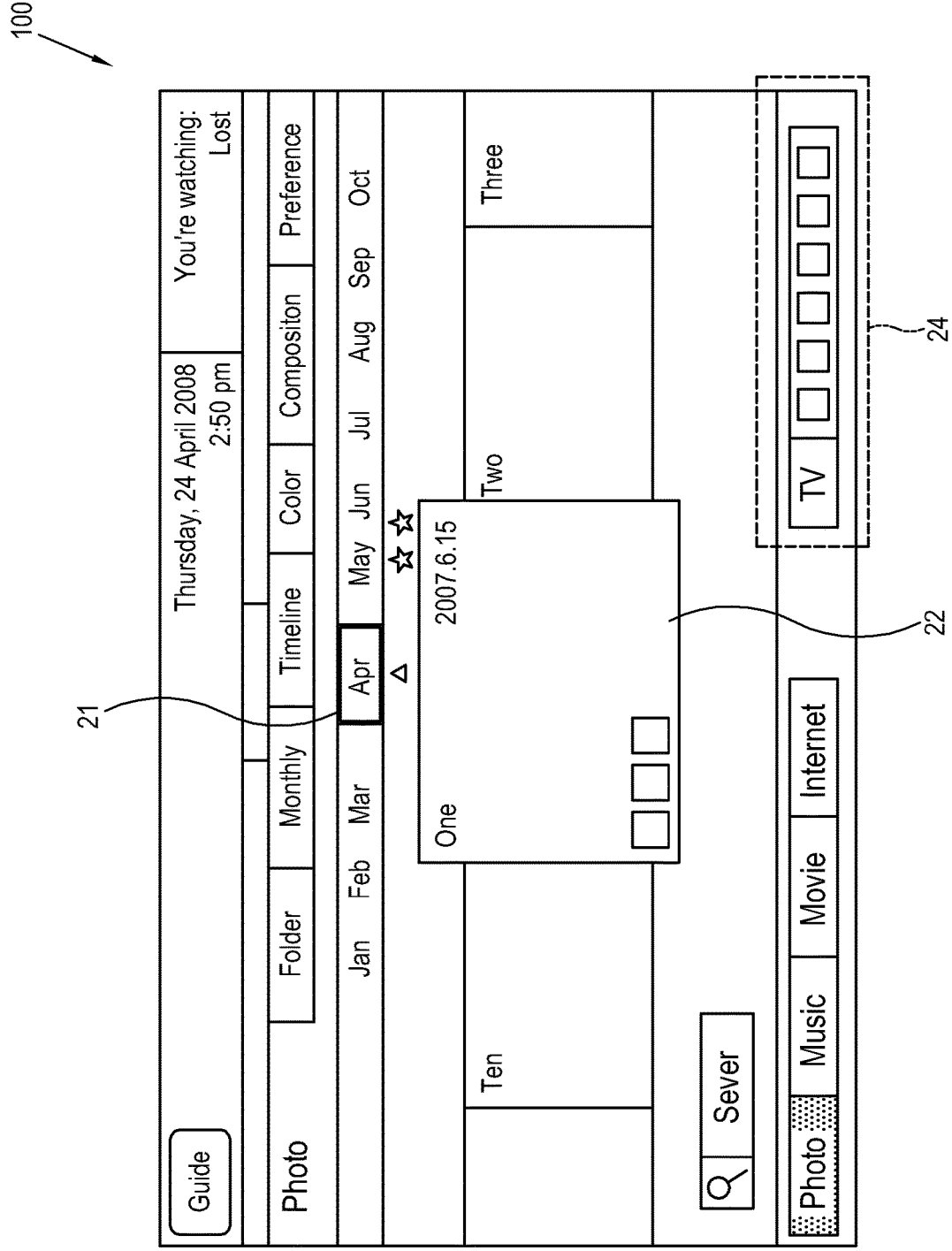

As shown in FIG. 5B, the first controller 170 may control the first display unit 130a, 130b to display the control panel 24 for controlling the contents displayed on the main image processing apparatus 200. A user may give a control command for the contents to the main image processing apparatus 200 through the control panel 24.

Figure 5C:
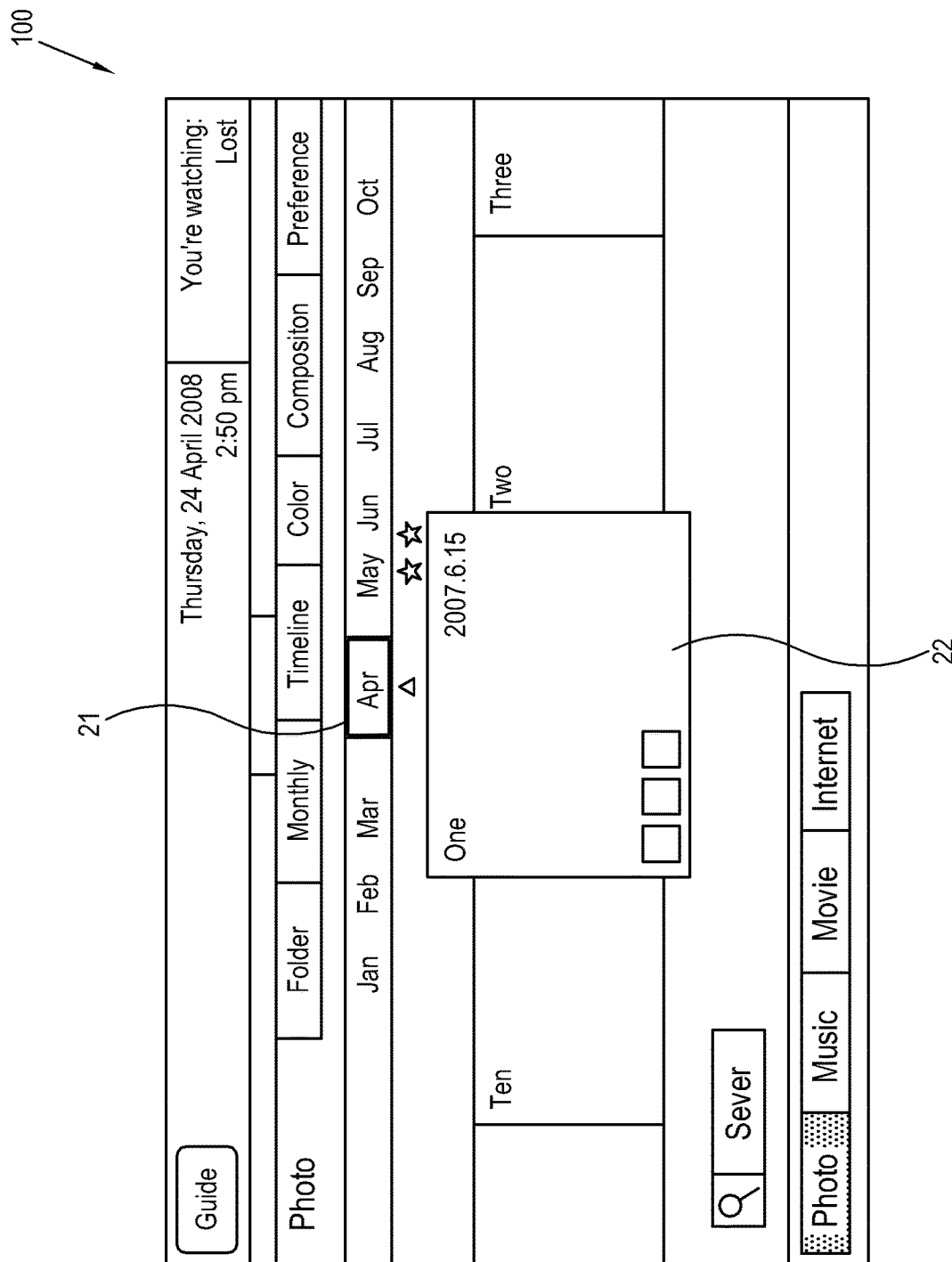

If the main image processing apparatus 200 is turned off, the sub image processing apparatus 100 receives the information about the power-off state of the main image processing apparatus 200 and closes the control panel 24 as shown in FIG. 5C.

Figure 6A:
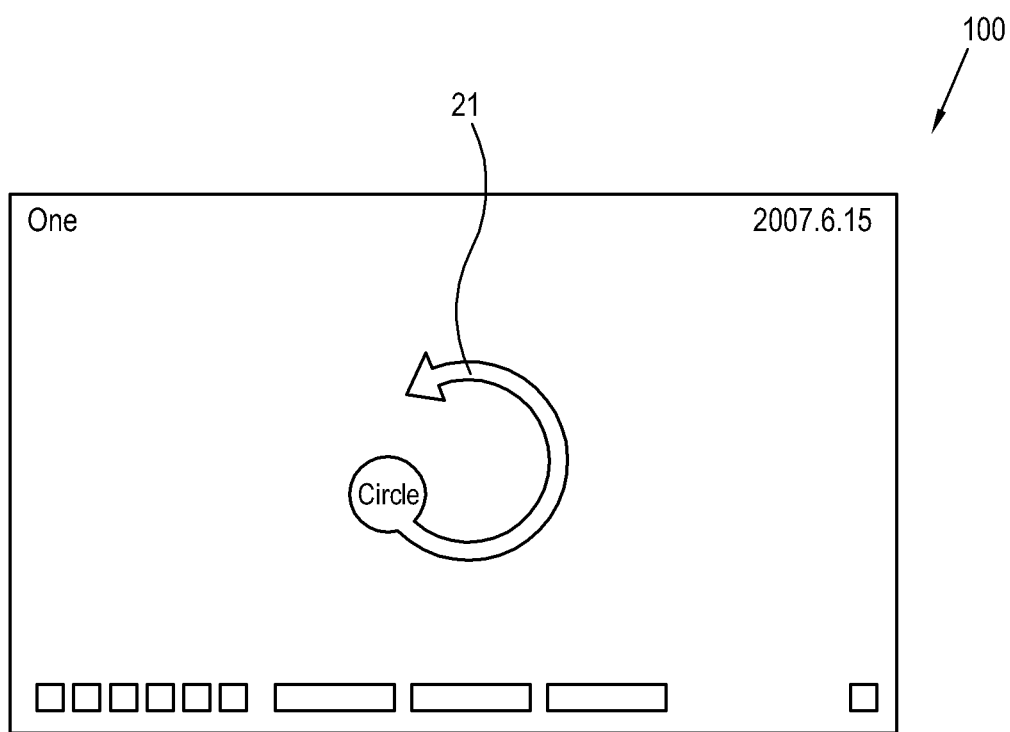

Meanwhile, the sub image processing apparatus 100 may display the contents of the view zone 22 in a full screen display as shown in FIG. 6A.

Figure 6B:
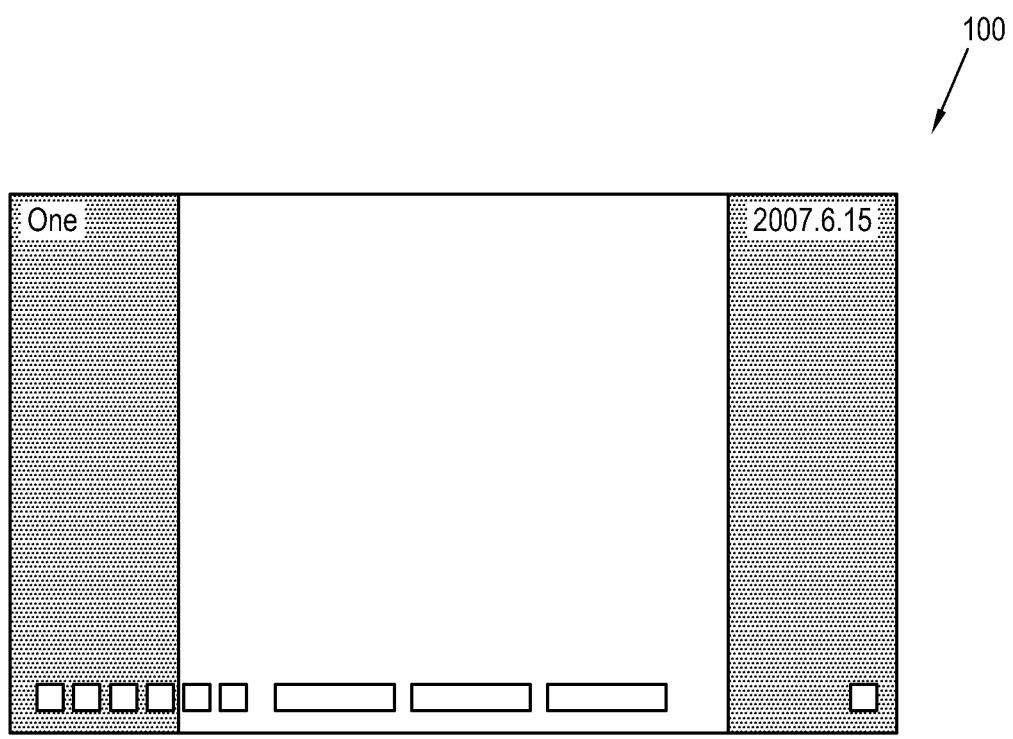

As shown in FIG. 6A, the sub image processing apparatus 100 may receive a circle input 12 as the touch input for the contents. Here, the circle input 12 means a touch input based on rotation at a predetermined angle and in a predetermined direction. When sensing the circle input 12, the first controller 170 controls the first image processing unit 120 to rotate the contents by the angle and direction of the received circle input 12 as shown in FIG. 6B and display the rotated contents on the first display unit 130a, 130b. Further, the first controller 170 controls the first communication unit 160 to transmit a control command for rotating the contents displayed on the main image processing apparatus 200 by the received angle and direction.

Figure 7A:
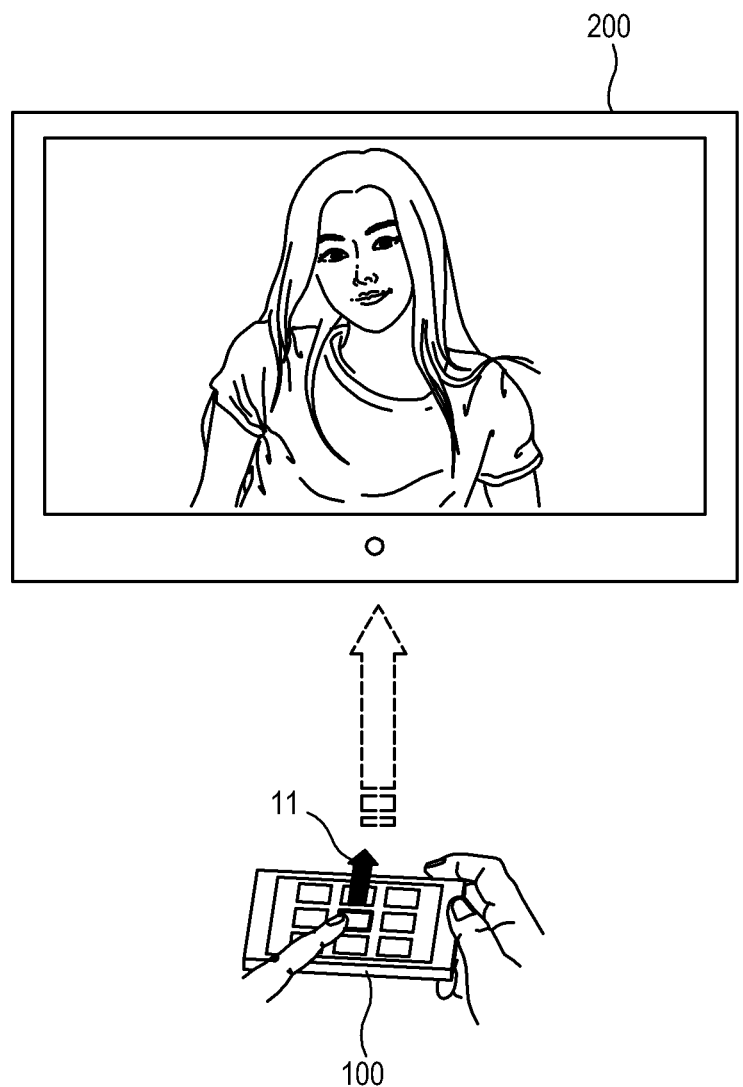
FIGS. 7A and 7B illustrate control of the main image processing apparatus on the basis of touch input according to an exemplary embodiment of the present invention.
Figure 7B:
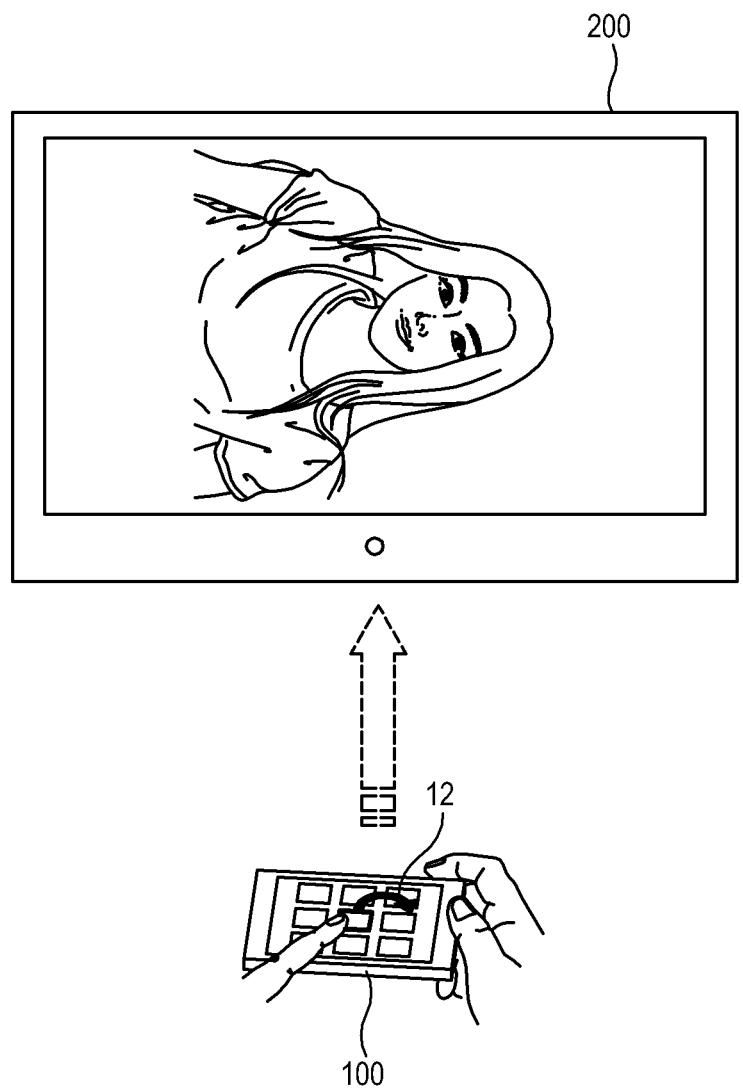

FIGS. 7A and 7B illustrate control of the main image processing apparatus 200 on the basis of touch input according to an exemplary embodiment of the present invention.

As shown in FIG. 7A, if the sub image processing apparatus 100 senses a user's flicking input that moves by a predetermined distance or more in a direction toward the main image processing apparatus 200, the main image processing apparatus 200 receives the control command corresponding to the flicking input and displays the contents changed according to the control command. In an exemplary embodiment, the user's flicking input is toward a physical location of the main image processing apparatus 200.

As shown in FIG. 7B, if the sub image processing apparatus 100 senses a user's circle input that rotates by a predetermined angle and a predetermined direction, the main image processing apparatus 200 receives the control command corresponding to the circle input and displays the contents rotated by the sensed angle and direction.

In the foregoing exemplary embodiment, the touch input having the directionality is described with respect to the flicking input the circle input, but not limited thereto.

In the main and sub image processing apparatuses 200 and 100 with this configurations, the control methods thereof will be described below with reference to FIGS. 8 and 9.

Figure 8:
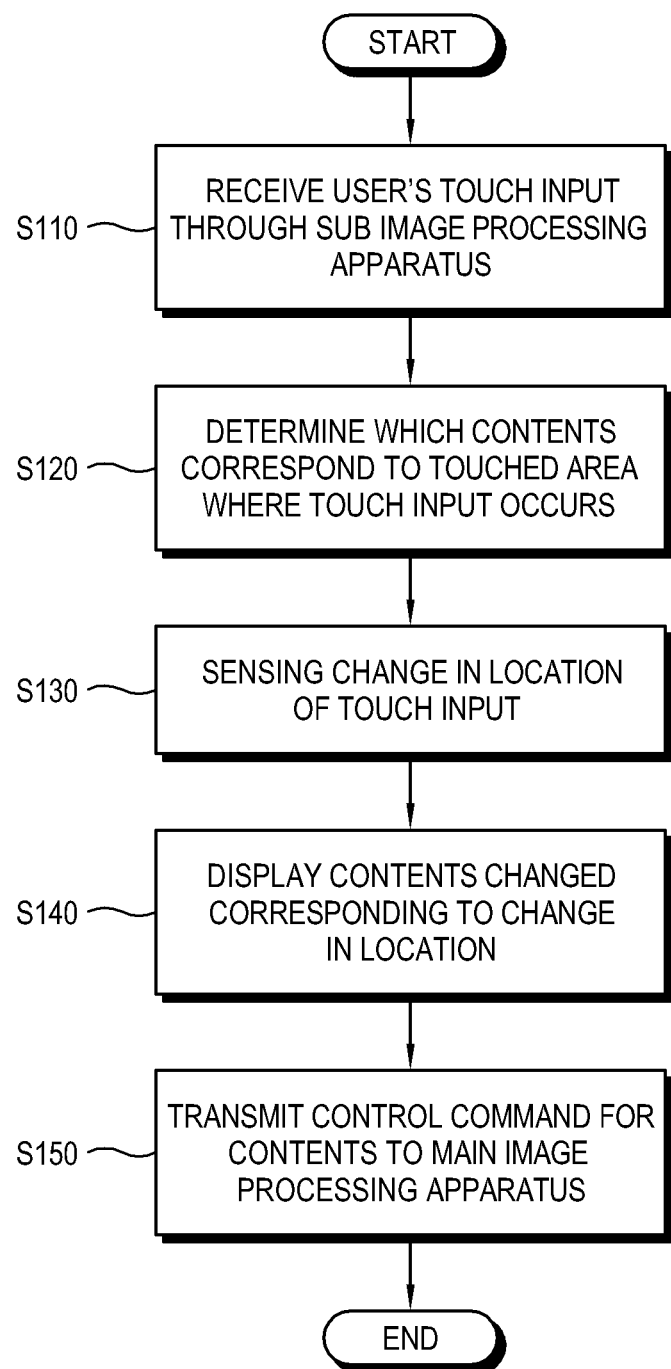
FIG. 8 is a flowchart of a control method of a sub image processing apparatus according to an exemplary embodiment of the present invention.

FIG. 8 is a flowchart of the control method of the sub image processing apparatus 100 according to an exemplary embodiment of the present invention.

Referring to FIG. 8, at operation S110 the sub image processing apparatus 100 receives a user's touch input through the first user input unit 140a, 140b.

At operation S120, the first controller 170 determines which contents correspond to the touched area in response to the touch input.

As operation S130, the first controller 170 senses the change in location of the touch input received in the operation S110. Here, the sensed change in the location may include the flicking input in which the location of the touch input moves by a predetermined distance or more in a predetermined direction, or the circle input in which the location of the touch input rotates at a predetermined angle and in a predetermined direction.

At operation S140, the first controller 170 controls the first image processing unit 120 to change the contents determined in the operation S120 in response to the change of the location sensed in the operation S130, and display it on the first display unit 130a, 130b.

At operation S150, the first controller 170 controls the first communication unit 160 to send the main image processing apparatus 200 a control command for the contents in response to the change in the location sensed in the operation S130. Here, the control command may be given as a control command that makes the same contents as displayed in the operation S140 be displayed on the main image processing apparatus 200. Further, the control command in the operation S140 may include a channel-switching command, a power-on command for the main image processing apparatus 200, etc.

Figure 9:
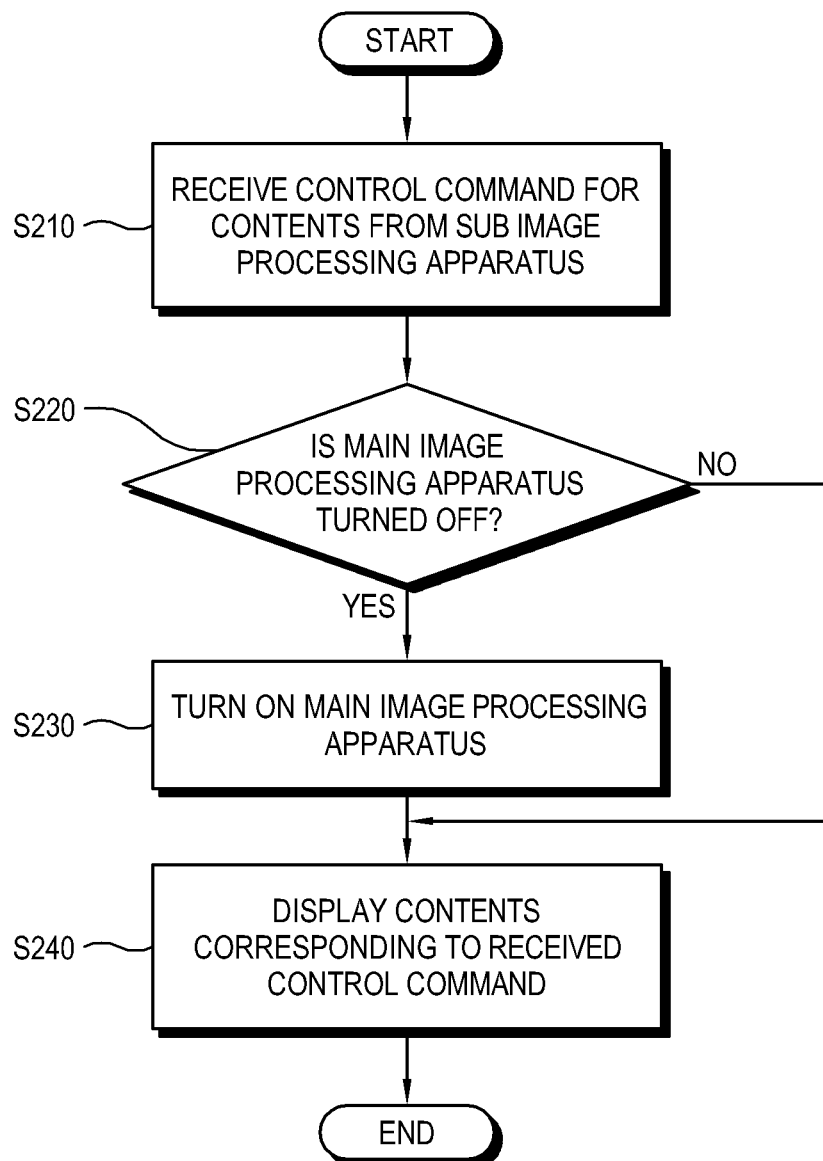
FIG. 9 is a flowchart of a control method of a main image processing apparatus according to an exemplary embodiment of the present invention.

FIG. 9 is a flowchart of the control method of the main image processing apparatus 200 according to an exemplary embodiment of the present invention.

Referring to FIG. 9, at operation S210 the main image processing apparatus 200 receives the control command for the contents from the sub image processing apparatus 100.

Here, if the main image processing apparatus 200 has been turned off at operation S220, the main image processing apparatus 200 is turned on in response to the received control command at operation S230.

At operation S240, the main image processing apparatus displays the contents corresponding to the control command received in the operation S210. Here, the main image processing apparatus 200 displays the contents changed (e.g., rotated) on the basis of the received control command, or switched in the channel.

In the dual image processing system 10 according to the above described exemplary embodiments of the present invention, the main image processing apparatus 200 is controlled through the sub image processing apparatus 100 supporting the touch input, and thus it is more convenient for a user to use the dual image processing system 10.

In the foregoing embodiments, the sub image processing apparatus 100 is used for transmitting the control command to the main image processing apparatus 200, but not limited thereto. Alternatively, the main image processing apparatus 200 may be used for controlling the sub image processing apparatus 100, or the control command may be transmitted and received between the main and sub image processing apparatuses 200 and 100.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus for allowing an external display apparatus to display a video image corresponding to a video content stored in the display apparatus comprising:
   a memory;
   a display; and
   a controller configured to:
   control the display to display a plurality of content thumbnails respectively associated with a plurality of video contents stored in the memory, and
   in response to receiving a first touch input for selecting one of the plurality of content thumbnails displayed on the display:
      identify a video content associated with the selected one of the plurality of content thumbnails, from among the plurality of video contents stored in the memory; and
      control the display to display a first screen comprising the identified video content; and
   in response to a second touch input on the display for transmitting the identified video content to the external display apparatus being received after the first screen comprising the identified video content is displayed on the display:
      transmit, to the external display apparatus, data associated with the identified video content, so that the external display apparatus displays a video image corresponding to the identified video content;
      while the video image is displayed on the external display apparatus, stop displaying the first screen and control the display to display a second screen comprising a plurality of menu items for controlling the video image displayed on the external display apparatus, wherein the displayed first screen does not comprise the plurality of menu items; and
      while the second screen is displayed on the display of the display apparatus, in response to information being received from the external display apparatus, control the display to re-display the first screen.

2. The display apparatus according to claim 1, wherein the first touch input for selecting one of the plurality of content thumbnails comprises an initial touch and a drag input following the initial touch, and the display displays a graphic item corresponding to the selected one of the plurality of content thumbnails, the graphic item being moved according to the drag input.

3. The display apparatus according to claim 2, wherein the displayed graphic item is larger than others of the plurality of content thumbnails that are not selected by the first touch input.

4. The display apparatus according to claim 1, wherein the controller is further configured to receive a touch input for the video content corresponding to the video image displayed in the external display apparatus after transmitting the identified video content to the external display apparatus, the touch input for rotating in a predetermined direction the video content corresponding to the video image displayed in the external display apparatus.

5. The display apparatus according to claim 1, wherein the controller is further configured to control the display to no longer display the plurality of menu items in response to receiving information about a power-off state of the external display apparatus.

6. The display apparatus according to claim 2, wherein the controller is further configured to transmit the data associated with the identified video content to the external display apparatus if the drag input satisfies a predetermined condition, the predetermined condition being satisfied if the drag input is moved in an upward direction of the display of the display apparatus with at least a predetermined distance.

7. The display apparatus according to claim 2, wherein the drag input comprises a flicking input including a continuous touch contact of a predetermined distance.

8. The display apparatus according to claim 1, wherein the controller is further configured to control the display to stop the display of the plurality of menu items based on information about a state of the external display apparatus.

9. The display apparatus according to claim 8, wherein the information about the state of the external display apparatus corresponds to information indicating power-off of the external display apparatus.

10. The display apparatus according to claim 1, wherein the controller is further configured to:
    receive the information from the external display apparatus, while the second screen is displayed on the display of the display apparatus; and
    in response to the information being received, control the display to display the identified video content, and no longer display the plurality of menu items.

11. The display apparatus according to claim 10, wherein the information received from the external display apparatus is information about a state of the external display apparatus.

12. A display apparatus for allowing an external display apparatus to display a video image corresponding to a video content stored in the display apparatus comprising:
    a memory;
    a display; and
    a controller configured to:
    control the display to display a plurality of content thumbnails respectively associated with a plurality of video contents stored in the memory, and
    in response to receiving a first touch input for selecting one of the plurality of content thumbnails displayed on the display:
       identify a video content associated with the selected one of the plurality of content thumbnails, from among the plurality of video contents stored in the memory; and
       control the display to display a first screen comprising the identified video content; and based on a second touch input, following the first touch input, on the display for transmitting the identified video content to the external display apparatus being received:
  transmit, to the external display apparatus, data associated with the identified video content, so that the external display apparatus displays a video image corresponding to the identified video content;
  while the video image is displayed on the external display apparatus, control the display to display a second screen comprising a plurality of menu items for controlling the video image displayed on the external display apparatus, wherein the second screen is displayed instead of the first screen while the video image is displayed on the external display apparatus, wherein the displayed first screen does not comprise the plurality of menu items;
  while the second screen is displayed on the display of the display apparatus, receive information from the external display apparatus; and
  in response to the information being received from the external display apparatus, control the display to display the first screen instead of the second screen.

13. The display apparatus according to claim 12, wherein the controller is further configured to control the display to no longer display the plurality of menu items in response to receiving information about a power-off state of the external display apparatus.

14. The display apparatus according to claim 13, wherein the controller is further configured to control the display to stop the display of the plurality of menu items based on information about a state of the external display apparatus.

15. The display apparatus according to claim 14, wherein the information about the state of the external display apparatus corresponds to information indicating power-off of the external display apparatus.

16. The display apparatus according to claim 12, wherein the controller is further configured to, in response to receiving a predefined signal from the external display apparatus, control the display to stop display of the second screen comprising the plurality of menu items, by replacing the displayed second screen with a new screen without the plurality of menu items.

17. A method of controlling a display apparatus for allowing an external display apparatus to display a video image corresponding to a video content stored in the display apparatus, the method comprising:
  displaying a plurality of content thumbnails respectively associated with a plurality of video contents stored in the display apparatus,
  in response to receiving a first touch input for selecting one of the plurality of content thumbnails displayed on a display:
    identifying a video content associated with the selected one of the plurality of content thumbnails, from among the plurality of video contents stored in the display apparatus; and
    displaying a first screen comprising the identified video content; and
  in response to a second touch input on the display for transmitting the identified video content to the external display apparatus being received after the first screen comprising the identified video content is displayed on the display:
    transmitting, to the external display apparatus, data associated with the identified video content, so that the external display apparatus displays a video image corresponding to the identified video content;
    while the video image is displayed on the external display apparatus, stopping displaying the first screen and displaying a second screen comprising a plurality of menu items for controlling the video image displayed on the external display apparatus, wherein the displayed first screen does not comprise the plurality of menu items; and
    while the second screen is displayed on the display of the display apparatus, in response to information being received from the external display apparatus, controlling the display to re-display the first screen.

18. The method according to claim 17, further comprising no longer displaying the plurality of menu items in response to receiving information about a power-off state of the external display apparatus.

19. The method according to claim 17, further comprising stopping the display of the plurality of menu items based on information about a state of the external display apparatus.

20. The method according to claim 19, wherein the information about the state of the external display apparatus corresponds to information indicating power-off of the external display apparatus.

21. The method according to claim 17, further comprising:
  receiving the information from the external display apparatus, while the second screen is displayed on the display of the display apparatus; and
  in response to the information being received, displaying the identified video content, and no longer display the plurality of menu items.

22. The method according to claim 21, wherein the information received from the external display apparatus is information about a state of the external display apparatus.

* * * * *